United States Patent [19]

Ishibai et al.

[11] 4,262,988

[45] Apr. 21, 1981

[54] BINOCULARS WITH AUTOMATIC FOCUSING SYSTEM

[75] Inventors: Isao Ishibai, Machida; Kunimitsu Kobayashi, Murayama, both of Japan

[73] Assignee: Hoya Corporation, Tokyo, Japan

[21] Appl. No.: 108,108

[22] Filed: Dec. 28, 1979

[30] Foreign Application Priority Data

Apr. 23, 1979 [JP] Japan .................................. 54-48951

[51] Int. Cl.³ ........................ G02B 7/11; G02B 23/00
[52] U.S. Cl. .......................................... 350/36; 350/47
[58] Field of Search ................. 350/46, 47, 36, 73-77, 350/145, 146; 354/25

[56] References Cited

U.S. PATENT DOCUMENTS

| | | | |
|---|---|---|---|
| 4,160,904 | 7/1979 | Wilwerding | 354/25 |
| 4,183,640 | 1/1980 | Abe | 354/25 |
| 4,186,300 | 1/1980 | Kozakai | 354/25 |

FOREIGN PATENT DOCUMENTS

205639  1/1909  Fed. Rep. of Germany .......... 350/145

Primary Examiner—Jon W. Henry
Attorney, Agent, or Firm—Sughrue, Rothwell, Mion, Zinn and Macpeak

[57] ABSTRACT

Binoculars including an automatic focusing system with light entry windows on both sides of the binoculars provided outwardly of the objective lenses. Movable and fixed reflecting elements are disposed inwardly of the light entry windows both of which direct incoming light images onto a focusing detecting module. The movable reflector is oscillated back and forth scanning the image reflected thereby laterally with respect to the stationary image reflected by the fixed reflector. An output control signal is produced when the two images are in alignment with one another and the ocular lenses are moved in accordance with this signal to properly focus the binoculars.

5 Claims, 5 Drawing Figures

BINOCULARS WITH AUTOMATIC FOCUSING SYSTEM

BACKGROUND OF THE INVENTION

The present invention relates to an optical system especially for use in binoculars. More particularly, the invention relates to an automatic focussing system for use with binoculars in which a pair of individual light entry windows for distance metering are provided near right and left objectives for introducing light rays via movable and fixed reflecting members into a focus detecting element module.

In most prior art binoculars constructions, the focus adjustment was carried out by manually turning an adjustment ring for the objectives to thereby make coincide a front focus of the oculars with a position of the focussing plane of the objectives.

However, it is time-consuming and somewhat inaccurate for the focussing operation to be carried out by moving the oculars in this manner. Therefore, the applicants previously proposed binoculars with an automatic focussing system in U.S. Patent Application Ser. No. 74,354 filed on Sept. 10, 1979 which is cited here not as prior art but is mentioned merely as disclosing a related device to aid in an explanation of the present invention. Binoculars as disclosed therein are shown in FIG. 5. In these binoculars, in the oculars, a fixed partially reflecting member b and a movable partially reflecting member b' made of semitransparent material are disposed following right and left objectives a and a'. Light rays passing through the partially reflecting member b and b' are introduced to oculars d and d' through prisms c and c' and simultaneously therewith the light rays reflected by the reflecting members b and b' are introduced to a focus detecting element module e. The movable reflecting member b' is so moved that a dual image formed by the reflecting member b and b' coincides on the focus detecting element module e while at the same time the oculars d and d' are moved, for example, by a step-up motors, cooperating with the movement of the movable reflecting member b' whereby automatic focussing is performed.

However, the above-described binoculars are somewhat disadvantageous in that, since a pair of objectives per se are used as light entry windows and the fixed and movable reflecting members are made of semitransparent reflex mirrors, the total light entering through the objectives a and a' is divided between the objective lenses and the focus detecting element module as a result of which the image through the objectives is reduced in intensity and in some cases an insufficient amount of light is supplied to the focus detecting element module. This leads to difficulties in obtaining good focussing accuracy if the light level is low.

SUMMARY OF THE INVENTION

In view of the above-noted potential difficulties in low-light situations, an object of the invention is to provide an improved automatic binocular focussing system in which a pair of light entry windows for distance metering are provided independent of the objectives to eliminate darkening of the view field and so that a sufficient amount of light is supplied to the focus detecting element module to thereby provide good focussing accuracy.

In accordance with this and other objects of the invention, there is provided binoculars including a focussing detecting element module, a movable reflecting member and a fixed reflecting member for introducing first and second rays of light to the focussing detecting element module, first and second oculars, means for moving the oculars according to an output control signal produced by the focussing detecting element module for focussing the binoculars, and first and second light entry windows for distance metering provided for supplying light to the movable reflecting member and the fixed reflecting member, respectively, the light path through the light entry windows being independent of that through the objectives of the binoculars. That is, the light rays which enter the light entry windows are separate from those entering the objective lenses. Preferrably, the light entry windows are provided outwardly with respective to the objectives.

This and other objects of the invention are also met by binoculars including first and second objectives, first and second oculars, means for providing first and second light entry windows adjacent to the first and second objectives, a focus detecting element module, a fixed reflecting member and a movable reflecting member for directing light from the first light entry window to the focus detecting element module, means for oscillating the movable mirror, and means for moving the oculars to focus the binoculars in response to an output control signal produced by the focus detecting element module when images reflected by the fixed and movable reflecting members are aligned with one another upon the focus detecting element module. In a preferred embodiment, the oscillating means includes a motor having an output rotary shaft, a cam shaft coupled to an output shaft of the motor, and a lever having a first end thereof in abutment with a surface of the cam and a second end thereof operatively coupled to move the movable reflecting member. As in the previous embodiment, the first and second light entry windows are preferably provided outwardly with respect to the objectives.

BRIEF DESCRIPTION OF THE PREFERRED EMBODIMENTS

Figure 1:
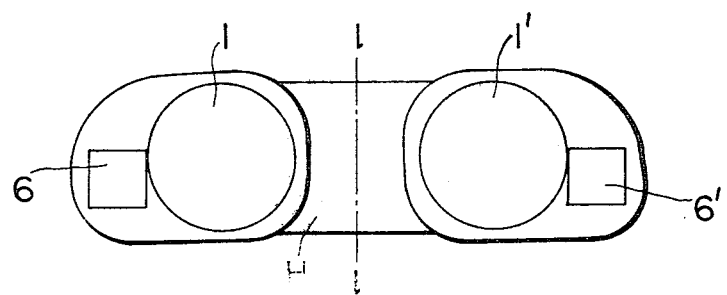
FIG. 1 is a front view of a preferred embodiment of binoculars with an automatic focussing system according to the present invention.
Figure 2:
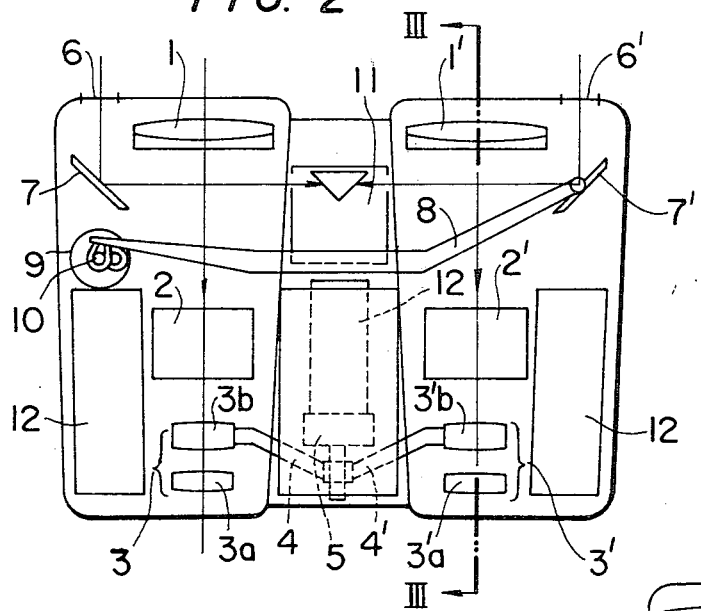
FIG. 2 is a plan view of the binoculars shown in FIG. 1.
Figure 3:
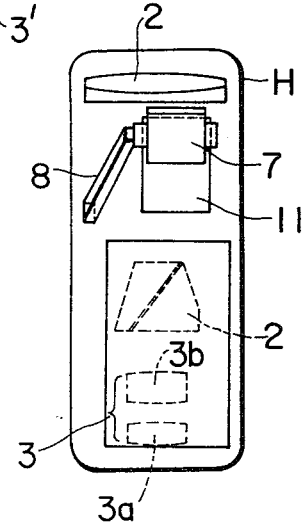
FIG. 3 is a cross-sectional view of the binoculars taken along the line III—III of FIG. 2 in which some parts have been omitted for clarification.
Figure 4:
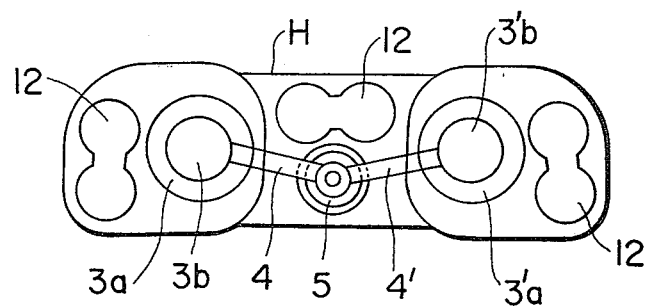
FIG. 4 is a rear view of the binoculars shown in FIG. 1.
Figure 5:
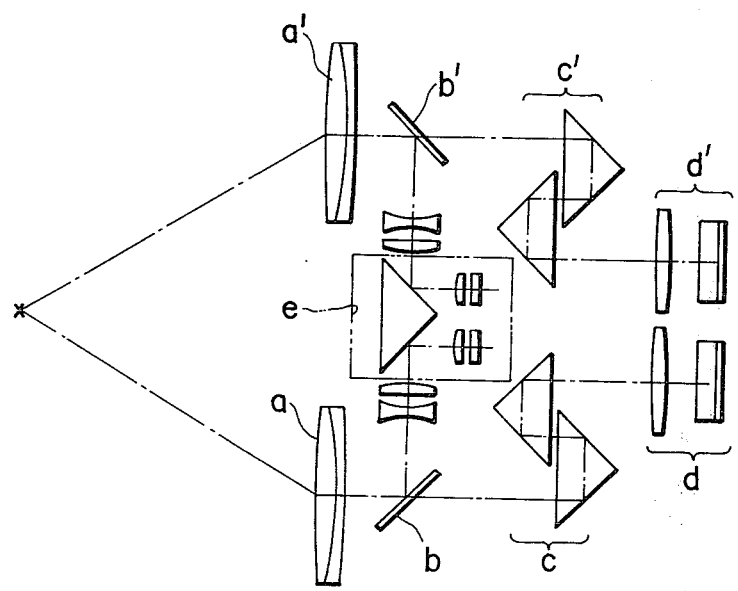
FIG. 5 shows a related binocular system.

The present invention will hereinafter be described with reference to FIGS. 1-4 of the accompanied drawings. Reference characters 1 and 1' denote the right and left objectives following which prism groups 2 and 2' are disposed, respectively. Reference characters 3 and 3', fixed ocular lenses 3a and 3'a are disposed adjacent to the outside of a housing H and are fixed in position with respect to the housing whereas movable ocular lenses 3b and 3'b are movable with respect to the housing H and disposed inside of the housing H. The movable ocular lenses 3b and 3'b are mechanically connected to an output shaft of an ocular driving motor 5 through a known gear mechanism and driving pins 4 and 4'. The ocular lenses 3b and 3'b are movable in response to the driving motor 5 back and forth to thereby vary the front focus formed by the composite ocular lens groups 3 and 3'.

Respective light entry windows 6 and 6' are formed on right and left sides of the objectives 1 and 1' in the housing H of the binoculars. It is desired that the light entry windows be symmetrically provided with respect to the center line 1 as shown in FIG. 1. In one preferred embodiment, the light entry windows 6 and 6' are provided outside of the objectives 1 and 1. However, they may instead be provided inside of the objectives 1 and 1' or in the vertical direction. A pair of reflecting members 7 and 7' are disposed after the windows 6 and 6', respectively. Reflecting member 7 is fixed in position while reflecting member 7' is movable. A drive lever 8 is connected to the movable reflecting member 7' the other end of which cooperates with the drive motor 9 for moving the movable reflecting member 7'. An eccentric cam 10 is attached to an output shaft of the drive motor 9 contacting and periodically moving the end of the drive lever 8. The other end of the drive lever 8 is spring-biased to move toward the eccentric cam 10.

A focus detecting element module 11 for receiving light from both reflecting members is disposed between the movable and fixed reflecting members 7 and 7'. The focus detecting element module 11 is of a type well-known in the art of automatically focussed cameras. In the module 11, when light rays from the right and left reflecting members 7 and 7' coincide corresponding to a properly focussed image, a signal is generated halting both the drive motor 9 for the movable reflecting member 7' and at the same time the ocular driving motor 5 cooperating with the drive motor 9.

Reference character 12 designates a battery cavity in which one or more dry batteries are provided as a drive source for the drive motors 5 and 9. The battery cavity is formed by utilizing otherwise unused space in the housing H.

The thus constructed optical ocular system operates as follows. Rays of light enter from the objectives 1 and 1' pass through the prism groups 2 and 2' and are focussed by the ocular lens groups 3 and 3'. In this case, the focal plane positions of the objectives and a front focus of the oculars do not coincide. In accordance with the invention, rays of light are introduced into the housing H through the light entry windows 6 and 6' provided on the right and left to the movable and fixed reflecting member 7 and 7'. Since the movable reflecting member 7' is continuously reciprocatingly moved or oscillated through the drive lever 8 by the drive motor 9, the image focussed by the movable reflecting member 7' is also reciprocatingly moved overlapping the image focussed by the fixed reflecting member 7. At the instant when the movable reflecting member 7' passes through an angle which is in proportion to the distance to the object being viewed, the two images coincide and at this time the focussing signal is outputted from the focus detecting module 11.

On the other hand, the oculars 3b and 3'b are controlled by an electronic control circuitry so as to be moved by a distance corresponding to the correct distance to the object being viewed. That is, the oculars 3b and 3'b are moved to a position corresponding to the angle of the movable reflecting member 7' at which the two images coincide. The position of the oculars at this time coincides with a position where the front focus is established at the same position as the image focussed by the objective lens.

Moreover, since the movement of the oculars is controlled according to a signal produced by the electronic circuitry, the movement may be commenced immediately after the images coincide. By using a memory circuitry, the moving operation may be initiated any time after the controlling signal is generated.

As mentioned above, a correct focussing operation where the light enters from the objectives 1 and 1' and is focussed by the oculars 3 and 3' on the image surface is properly carried out. As is obvious from the foregoing description, by repeated operation, a correctly focussed image can always be maintained even if the distance to the object is varied.

As is apparent from the above, in the binoculars according to the present invention, sufficient amounts of light are provided both to the distance metering optical system and the objective and ocular optical systems independently, since light entry windows are provided independent of the objectives so as to thereby provide a bright and accurately focussed image. Especially, in the case where the light entry windows are provided outwardly of the objectives as shown in the figures, since the distance between the right and left windows may be widened, the metering accuracy of the binoculars is greatly enhanced.

Also, the separation between the objective optical system and metering optical system eliminates the need for semitransparent mirrors between the objectives and the prism groups so that the construction of the optical system is simplified thereby reducing the chance of mechanical failure while enhancing the mechanical strength and simplifying the assembly of the binoculars.

What is claimed is:

1. Binoculars comprising a focus detecting element module, movable reflecting member and a fixed reflecting member for introducing first and second rays of light to said focusing detecting element module, first and second oculars, means for moving said oculars according to an output control signal produced by said focusing detecting element module for focusing the binoculars, and first and second light entry windows for distance metering provided for supplying light to said movable reflecting member and said fixed reflecting member, respectively, the light path through said light entry windows being independent of that through objectives of said binoculars.

2. Binoculars according to claim 1 wherein said light entry windows are provided outwardly with respect to the objectives, respectively.

3. Binoculars comprising:
   first and second objectives;
   first and second oculars;
   means for providing first and second light entry windows adjacent said first and second objectives;
   a focus detecting element module;
   a fixed reflecting member and a movable reflecting member for directing light from said first light entry window to said focus detecting element module;
   means for oscillating said movable mirror; and
   means for moving said oculars to focus said binoculars in response to an output control signal produced by said focus detecting element module when images reflected by said fixed and movable reflecting members are aligned with one another upon said focus detecting element module.

4. Binoculars according to claim 3 wherein said oscillating means comprises:
a motor;
a cam shaft coupled to an output shaft of said motor; and
a lever having a first end thereof in abutment with a surface of said cam and a second end thereof operatively coupled to move said movable reflecting member.

5. Binoculars according to either of claims 3 or 4 wherein said first and second light entry windows are provided outwardly of said objectives.

* * * * *